Feb. 28, 1967 S. KAGAN 3,307,107
KEYED CAMERA TRANSMITTER AND CONTROL CIRCUIT THEREFOR
Filed Dec. 4, 1963 2 Sheets-Sheet 1
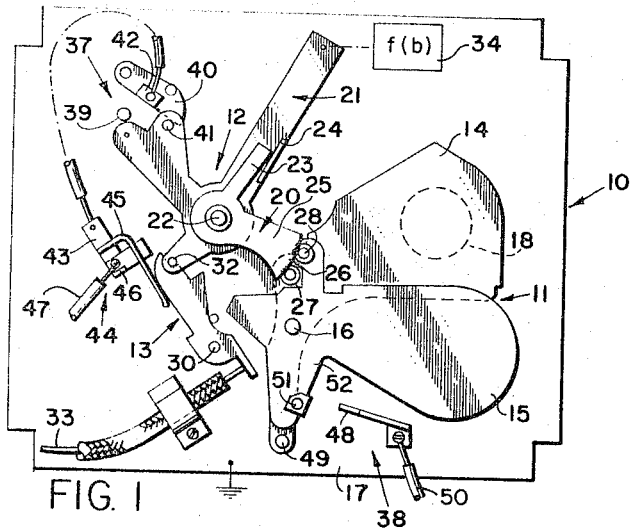
FIG. 1
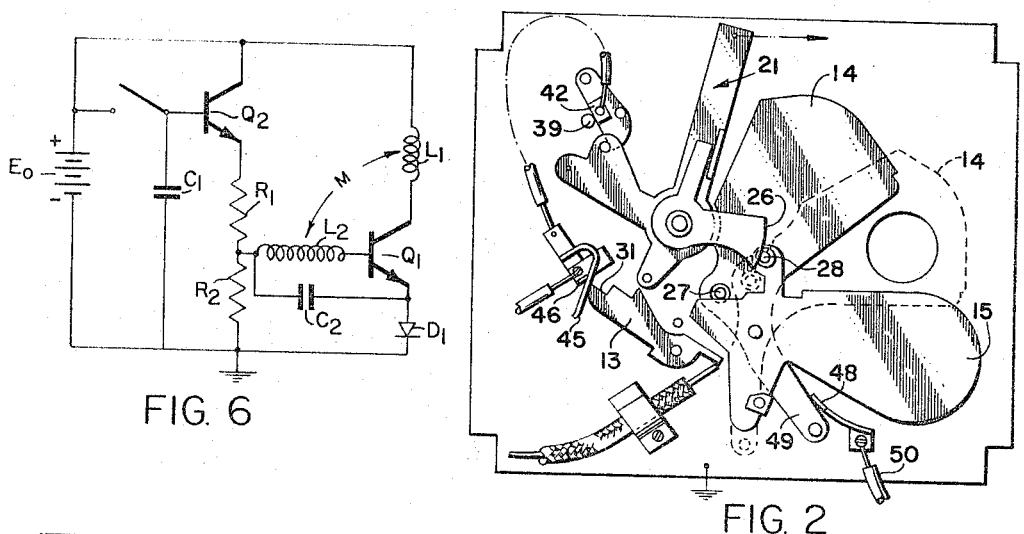
FIG. 6
FIG. 2
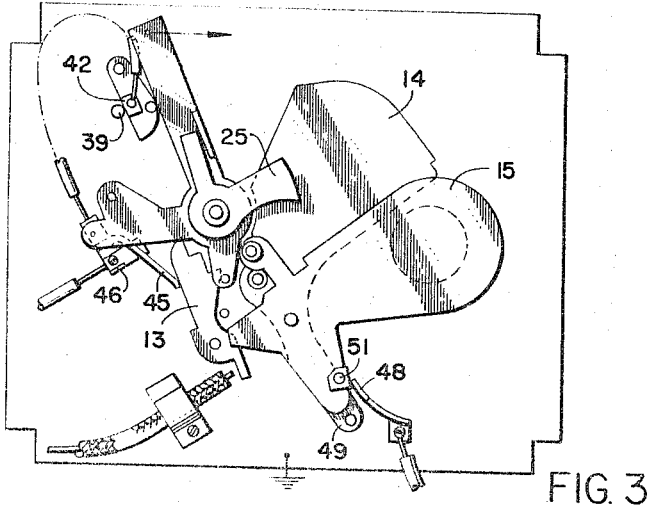
FIG. 3
INVENTOR.
Sholly Kagan
BY
Broward Mikulka
and
Donald M. Sandler
ATTORNEYS

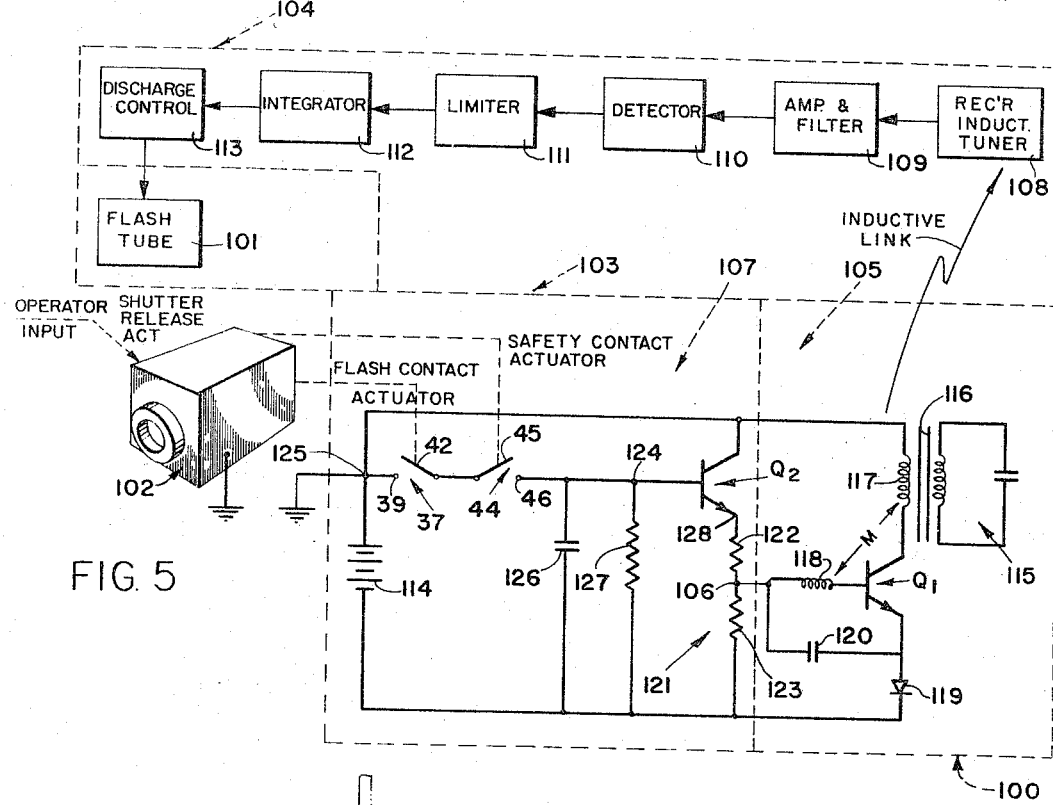
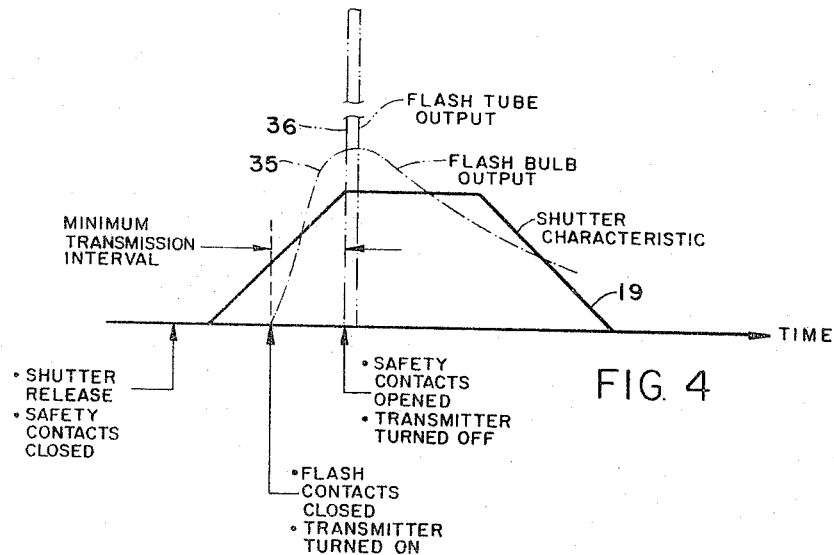

United States Patent Office 3,307,107
Patented Feb. 28, 1967

3,307,107
KEYED CAMERA TRANSMITTER AND CONTROL CIRCUIT THEREFOR
Sholly Kagan, Natick, Mass., assignor to Polaroid Corporation, Cambridge, Mass., a corporation of Delaware
Filed Dec. 4, 1963, Ser. No. 328,068
1 Claim. (Cl. 325—102)

This invention relates generally to electronic flash photography apparatus of the type remotely controlled via a control signal broadcast from the camera; and more particularly to apparatus of the type described wherein interference is suppressed by utilizing a receiver constructed to cause ionization of the tube at the end of an uninterrupted burst of the control signal that lasts a predetermined time, the initiation of the broadcast of the control signal being determined by the shutter movement so that the flash occurs at maximum shutter opening.

Triggering conventional electronic flash apparatus connected to a camera by a cable is generally accomplished by providing, in the shutter mechanism, a pair of contacts (termed "X" contacts for reference) which are closed by the movement of the shutter to its position of maximum opening causing a trigger voltage to be applied to the tube. Because ionization of the flash tube is instantaneous with the application of the trigger voltage, the pulse of light emitted by the tube upon ionization occurs at maximum shutter opening. In most cameras, the shutter speed is kept fixed, and correct exposure is achieved by adjusting the exposure aperture in relation to the distance of the subject being photographed from the camera. A flash tube remotely located relative to the camera can be triggered by a radio signal broadcast from the camera in response to the closing of the "X" contacts, since the flash still will occur simultaneously with the closing of the contacts (i.e., at maximum shutter opening) because the signal is propagated from the camera to the remote flash tube at the speed of light. However, this approach is severely limited by the fact that spurious signals, unrelated to the position of the shutter, will trigger the flash. For this reason, those skilled in the art have resorted to various coding techniques for suppressing response of the flash tube to all but special signals. One particularly simple and reliable technique, disclosed and claimed in copending application Serial No. 203,988, filed June 20, 1962, now Pat. No. 3,185,056, and assigned to the same assignee as this application, involves the use of an induction field link in the VLF region of the spectrum, to permit miniaturization of the antennae at the camera and the receiver, and a receiver which triggers the flash tube at the end of a burst of signal that lasts a predetermined time. In other words, for a signal to result in the flash tube producing a pulse of light, such signal must be at the proper frequency and have an uninterrupted duration no less than a predetermined time, and receiver triggering the flash tube at the end of such time. Essentially, then, this technique requires a transmitter at the camera capable of generating a sustained induction field at the desired frequency for a predetermined time prior to maximum shutter opening.

Fortunately, most cameras are provided with a pair of contacts (termed "M" contacts for reference) which close a short time prior to maximum shutter opening, and by using this time interval to establish the predetermined time required by the receiver, the "M" contacts offer a convenient way to initiate operation of the transmitter. In this manner, the flash tube will be ionized at the instant of maximum shutter opening. In applying this technique to existing cameras, considerable difficulty is experienced in maintaining uninterrupted signal transmission after the "M" contacts are initially closed. The problem apparently arises due to the nature of these contacts, their design having been related to closing a circuit by which a vaporizable flash bulb is to be ignited rather than to maintaining uninterrupted operation of a signal generator. To understand this problem, the nature of the transient output of a vaporizable flash bulb due to burning characteristics of the vaporizable material must be taken into account. Such characteristics result in a light output whose duration is comparable to the total time required by the shutter to uncover and then close the exposure aperture. Furthermore, since the shutter efficiency of most cameras is considerably less than 100% (which is to say that the exposure aperture is neither instantaneously entirely uncovered nor instantaneously entirely covered), it is necessary, in order to achieve proper exposure of the scene being photographed, to correlate the occurrence of the output of the flash bulb with the shutter characteristic, the latter taking into account the finite time required to uncover and cover the exposure aperture. This is conveniently done by designing the "M" contacts such that they close at a time prior to maximum shutter opening at which proper correlation is achieved. Because combustion of the vaporizable material is at least momentarily self-sustaining after ignition has been initiated by the closing of the "M" contacts, momentary disengagements of the latter due to contact "bounce" or "jitter" have little practical effect on the shape of the output flash and hence do not interfere with obtaining proper exposures. Hence, prior to the invention disclosed and claimed in copending application Serial No. 203,988, filed June 20, 1962, there was no need to be concerned with contact "bounce" or "jitter" associated with the "M" contacts, and as a consequence, literally millions of cameras are in use at the present time with "M" type contacts inherently incapable of remaining in uninterrupted engagement of the shutter to maximum opening position. This factor would normally remove from the market for remotely controlled electronic flash apparatus of the type described, millions of potential customers, since the essence of such apparatus requires continuous engagement of the contacts once they are initially closed.

It is therefore the primary object of the present invention to eliminate contact "bounce" or "jitter" as a factor in the operation of remotely controlled apparatus of the type described. Specifically, the object of the present invention is to provide, in remotely controlled apparatus of the type described, a signal generating device which, in response to initial closing of the flash contacts of a camera, will operate uninterruptedly for a predetermined time interval despite intermittent opening and closing of the contacts during such interval, such that the apparatus can be reliably used in existing cameras without modification to the flash contacts thereof.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims that the conception upon which this disclosure is based may readily be utilized as a basis for designing other structures for carrying out the several purposes of this invention. It is important, therefore, that the claim to be granted herein shall be of sufficient breadth to prevent the appropriation of this invention by those skilled in the art.

For a fuller understanding of the nature and objects of the invention, reference should be had to the following detailed description taken in connection with the accompanying drawings wherein:

FIGURES 1, 2 and 3 are plan views of a typical camera shutter mechanism for the purpose of illustrating the relative positions of the various components constituting the mechanism just prior and subsequent to completion of exposure;

FIG. 4 is a time diagram for the purpose of illustrating the correct synchronization of the output of a vaporizable flash bulb and a discharge type flash tube with a shutter characteristic of the type developed by the shutter mechanism shown in FIGS. 1, 2 and 3;

FIG. 5 is a schematic diagram of electronic flash apparatus into which the present invention is incorporated and associated with a camera having a shutter mechanism of the type shown in FIGS. 1, 2, and 3; and FIG. 6 is a circuit diagram of a transistor configuration into which the present invention is incorporated.

Referring now to the drawings, reference numeral 10 designates a typical camera shutter mechanism which is discussed only for the purpose of illustrating the manner in which the closing of "M" and "X" type contacts may be related to the shutter movement, the invention not being dependent upon the specific nature of the mechanism by which synchronization is achieved. Essentially, mechanism 10 includes shutter means 11, shutter operator means 12, and shutter release lever 13. Shutter means 11 includes opening blade 14 and closing blade 15, each pivotably mounted for rotation about stud 16 rigidly attached to housing 17 containing exposure aperture 18. Blade 14 has a blocking position covering the aperture (FIG. 1) and an unblocking position uncovering the aperture (FIGS. 2 and 3), while blade 15 has an unblocking position uncovering the aperture (FIG. 1) and a blocking position covering the aperture (FIGS. 2 and 3). Spring means (not shown) constantly urges the opening blade from blocking to unblocking position to initiate exposure and the closing blade from unblocking to blocking position to terminate exposure. Because of the finite time required to uncover and cover the aperture the light able to pass through will vary with time generally in the manner shown by curve 19 in FIG. 4.

Returning now to FIGS. 1-3, shutter operator means 12 includes cam means 20 and cam operator means 21, both of which are rotatably mounted on stud 22 rigidly attached to housing 17. A torsion spring (not shown) between means 20 and 21 urges arm 23 on means 20 into engagement with flange 24 on means 21 to permit resilient pivotal relative movement in one direction between means 20 and 21. Another torsion spring (not shown) between means 21 and the housing urges means 21 (and means 20 as a result of flange 24) from its cocked position (FIG. 1), toward its intermediate position (FIG. 2) and to its uncocked position (FIG. 3). However, lever 13, rotatably mounted on stud 30 and having notch 31 in one end is urged by a spring (not shown) into latching contact with pin 32 on means 21 such that the latter is releasably maintained in cocked position.

Depression of the shutter release button of the camera (not shown) by an operator imparts movement to flexible cable 33 which actuates the shutter means by pivoting lever 13 out of latching contact with pin 32 (FIG. 2). Upon release of the shutter button, spring means (not shown) returns the cable to the position shown in FIGS. 1 and 3 permitting lever 13 to return, under spring bias, to the position shown in FIGS. 1 and 3. When means 21 is in its cocked position (FIG. 1), arm 25 on means 20 and having an arcuate follower face 26, engages cam roller 27 on opening blade 14 for maintaining the latter in blocking position, and cam roller 28 on closing blade 15 for maintaining the latter in unblocking position. When means 21 moves to its intermediate position (FIG. 2), only roller 28 remains engaged with face 26 for maintaining the closing blade in unblocking position and roller 27, being disengaged from face 26, permits the opening blade to move to its unblocking position thereby initiating exposure. When means 21 moves to its uncocked position (FIG. 3), cam means 20 is moved until face 26 no longer engages roller 28, thereby permitting the closing blade to move to blocking position and terminate exposure.

As shown in FIG. 4, there is a small delay subsequent to shutter release, i.e., pivotal movement of lever 13 out of engagement with pin 32 of means 21, before the opening blade begins to uncover the exposure aperture. The amount of light passed through the aperture by the shutter means is the area under curve 19. The latter is determined by the time required for means 21 to pivot from its cocking position to its uncocking position. This in turn is controlled by mechanical means 34 which may be manually set to exert a predetermined force on means 21 that opposes the torsion force thereon tending to move it to its uncocked position. In a typical shutter mechanism, the order of magnitude of the time between shutter release and maximum shutter opening is approximately 10–20 milliseconds.

Superimposed on shutter characteristic curve 19 shown in FIG. 4 are light curves representative of properly synchronized transient illumination characteristics representative of a vaporizable flash bulb and a discharge flash tube. Flash bulb output 35 is properly synchronized with shutter characteristics 19 when the instant of maximum light output from the bulb occurs substantially at the same time that maximum shutter opening occurs. Because the time required between initial ignition of the vaporizable material in a flash bulb and the instant when the ignition is complete and the light reaches a maximum output is of the same order of magnitude as the time required by the opening blade to completely uncover the exposure aperture, it is necessary to initiate ignition a short time prior to maximum shutter opening as shown in FIG. 4. On the other hand the light output from a discharge type flash tube (curve 36) is essentially an impulse, which means that the light pulse is very narrow with a very high intensity. The output from a discharge type flash tube has this characteristic because ionization of the tube is completed substantially instantaneously with the application of a trigger voltage. Flash tube output 36 is synchronized with shutter characteristic 19 when the impulse occurs during the time that the shutter blade is in its maximum open position. In order to permit a given shutter mechanism to be synchronized with either the output of a vaporizable flash bulb or a discharge type flash tube, it is necessary for the shutter mechanism to include at least two sets of switches: one set ("M" type contacts) for initiating ignition of a vaporizable flash bulb a predetermined period prior to maximum blade opening, and another set ("X" type contacts) for triggering the flash tube at the instant of maximum shutter opening.

Referring back to FIGS. 1-3, the shutter mechanism shown therein is provided with "M" type contacts 37 and "X" type contacts 38. Contacts 37 include a terminal 39 rigidly attached to housing 17 and constituting a ground reference for the electrical system. Rotatably mounted adjacent terminal 39 is nonconducting arm 40 urged by a spring (not shown) toward engagement with terminal 39. Pin 41 attached to means 21 separates contact 42 mounted on arm 40 from terminal 39 when means 21 is in the position shown in FIG. 1, which is to say, prior to the initiation of exposure. As means 21 moves toward its intermediate position shown in FIG. 2, at which exposure is initiated by the movement of the opening blade to its unblocking position, pin 41 has moved sufficiently far to permit contact 42 to engage terminal 39 thus connecting the electrical ground to terminal 43 of safety switch 44. The geometry of the movable parts is such that contact 42 engages terminal 39 at a predetermined time prior to the movement of opening blade 14 to its unblocking position, and by proper design such predetermined time can be matched to a flash bulb characteristic. Terminal 43 is insulated from housing 17 and from conducting arm 45 which resiliently engages lever 13. The pivotal movement of lever 13 to its unlatching position shown in FIG. 2 resiliently deforms conducting arm 45 into engagement with lug 46 which is electrically connected to terminal 43 and wire 47. However, the positioning of safety switch 44 relative to lever 13 is such that terminal 43 is electrically connected to wire 47 prior to the time that contact 42 engages terminal 39. When lever 13 is released and returns to the position shown in FIG. 3 (that is, subsequent to termination of exposure) safety switch 44 is opened thereby removing the ground connection from wire 47. In this manner wire 47 is grounded only as long as necessary to insure proper ignition of the vaporizable flash bulb which is connected in series with wire 47.

"X" contacts 38 include a resilient arm 48 mounted on housing 17, but insulated therefrom, and in the path of movement of arm 49 which is a part of opening blade 14. The positioning of arm 48 relative to arm 49 is such that the two arms contact each other at the instant the opening blade has completely uncovered exposure aperture 18 as shown in FIG. 2. This contact between the two arms connects lead 50 to ground and can be used to trigger a discharge type flash tube. A safety switch is provided in this circuit and operates when nonconducting block 51 attached to arm 52 of closing blade 15 engages arm 48 and cams the latter out of engagement with arm 49 of the opening blade thereby disconnecting the ground connection from lead 50.

The above-described shutter mechanism is typical of literally millions of cameras owned by the public at the present time, and as already indicated, the "M" and "X" contacts were designed primarily for use with vaporizable flash bulbs and flash tubes respectively, that were physically attached to the camera. In particular, the "M" contacts are highly susceptible to contact "bounce" or "jitter," but this action has little effect on proper ignition of vaporizable flash bulbs since, if the ignition circuit is momentarily opened after it has been initially closed, ignition is self-sustaining during the interval and the light output of the bulb is not seriously altered from the output were no momentary opening to occur. Such momentary opening of the contacts after their initial closing, however, is a problem when it is desired to adapt this type of shutter mechanism to interference-suppressed electronic flash photography apparatus of the type described in copending application Serial No. 203,988, filed June 20, 1962. This copending application discloses electronic flash photographic apparatus of the type wherein the flash tube is remote from the camera and synchronization of the flash impulse with maximum shutter blade opening is achieved via a radio signal broadcast from the camera. Spurious outputs from the flash tube are suppressed by causing the receiver to trigger the tube only in response to a received C.W. signal having a duration no less than a given interval of time. Since the "M" contacts close some time prior to maximum shutter blade opening, and, except for contact "bounce" or "jitter," remain closed until maximum blade opening is achieved, they provide a convenient way to initiate a C.W. signal. The problem is to sustain the C.W. signal uninterruptedly despite contact "bounce" or "jitter," and it is this problem to which the present invention is directed.

Accordingly, reference is now made to FIG. 5, wherein numeral 100 designates interference-suppressed electronic flash apparatus wherein flash tube 101 is remote from camera 102, and synchronization of the output from the flash tube with the opening of the shutter is achieved via a radio signal broadcast from the camera location to the remote location of the flash tube. Flash apparatus 100 includes transmitter means 103 physically attached or electrically connected to camera 102, receiver means 104 and flash tube 101. Transmitter means 103 includes oscillator means 105 responsive to a control voltage at node 106 for generating a C.W. signal as long as the control voltage is present and transmitting said signal to receiver means 104; and control means 107 responsive to the initial closing of "M" contacts 37 (safety switch 44 being previously closed) for developing said control voltage at node 106 without interruption despite intermittent opening and closing of contacts 37.

Receiver means 104 includes antenna-tuner assembly 108 for receiving the signal broadcast from oscillator means 105; circuit 109 for amplifying and filtering the output of assembly 108 to obtain the C.W. signal; detector 110 whose output is a pulse commencing when switch 37 is closed and ending when safety switch 44 is opened (provided, of course, that the output of oscillator means 105 is continuous during the interval); limiter 111 for limiting the amplitude of the pulse out of detector 110; integrator 112 for integrating the amplitude-limited pulse and providing a time varying voltage that reaches a trigger lever only if the pulse out of detector 110 is continuous; and discharge control means 113 for causing flash tube 101 to be ionized when the trigger lever is reached thereby causing the impulse of light from the tube to occur at maximum shutter opening. Details of the construction and operation of receiver 104 are disclosed in copending application Serial No. 203,988 filed June 20, 1962.

Oscillator means 105 comprises transistor Q1 arranged in a circuit that provides amplification and regenerative feedback, the necessary D.C. bias voltage for oscillations to exist being furnished by battery 114 and control means 103. Specifically, the frequency-determining element may include L-C tank circuit 115 tuned to a frequency in the VLF region of the spectrum, wherein the inductance is constituted by a coil wound on unshielded ferrite core 116 that constitutes the antenna of the transmitter means. Tank circuit 115 is coupled to transistor Q1 by coil 117 also wound on core 116 and connected between the collector electrode of Q1 and one side of battery 114. Regenerative feedback is established by coil 118 also wound on core 116 and connected between the base electrode and node 106 of control means 103. The emitter electrode is coupled to the other terminal of battery 114 through diode 119 whose polarity is the same as the polarity of the base-emitter junction. Capacitor 120 coupled between node 106 and the emitter electrode of Q1 is effective to A.C. couple the base to the emitter when the circuit is in oscillation.

With switches 37 and 44 in their open position as shown in FIG. 5, one side of battery 114 is applied to both the base and emitter sides of the transistor configuration, while the other side of the battery is connected to the collector. The polarity of the battery is in the direction to forward bias both diode 119 and the emitter-base junction of the transistor, and to reverse bias the collector-base junction. A large leakage current thus tends to flow but the forward characteristic of diode 119 is such that there is a sufficient forward voltage drop thereacross to reverse bias the emitter-base junction thus limiting the flow of leakage current in the configuration. However, when switches 37 and 44 are closed, the voltage at node 106, subject to the influence of capacitor 120, eventually forward biases the emittre-base junction shifting the operating point of diode 119 to a region where its forward resistance is very low. Thus, when the transistor is biased for operation, the diode acts as a very small emitter resistor, and when the transistor is back-biased, the diode acts as a very large resistance materially limiting the flow of leakage current.

Control means 107 contains voltage divider network 121 comprising series resistors 122 and 123 coupled at node 106 such that a control voltage is developed there in response to at least a predetermined level of current flow therethrough; and transistor Q2, whose output terminal 123 is connected to the input of network 121, and whose input terminal 124 is connected through switches 37 and 44 to terminal 125 of battery 114. The common terminal of Q2 is also connected to terminal 125 as shown in the drawing. The purpose served by the parallel arrangement of capacitor 126 and resistor 127 will be apparent from a description of the operation of the circuit. It should be noted first, however, that as long as either switch 37 or 44 is open, the base-emitter junction of Q2 is not biased to cause current to flow in network 121, and since the latter cannot under this circumstance develop a voltage at node 106 sufficient to forwardly bias the base-emitter junction of Q1, oscillator means 105 is turned off.

When the operator of the camera depresses the shutter release actuator, safety switch 44 closes as the opening blade begins to uncover the exposure aperture. When "M" switch 37 closes, the base and collector electrodes are at the same potential, capacitor 126 is instantaneously charged to full battery potential, and the base-emitter junction of Q2 is forwardly biased. Under these conditions, Q2 acts essentially as a diode. That is to say, the base-emitter junction acts as a diode causing current to flow in network 121 to at least the level sufficient to develop at node 106 the control voltage sufficient to forwardly bias Q1 into condition. Thus, oscillator means 105 breaks into oscillation at the instant switch 37 is closed. The induction field associated with unshielded core 116 is propagated to a similar unshielded ferrite core located at tuner 108 at the receiver.

However, when switch 37 is momentarily opened, as for example, when contact 42 bounces against terminal 39, battery 114 is no longer connected to the base of transistor Q2. The latter now acts as a transistor in that the current in the base thereof arising due to the discharge of capacitor 126 is amplified by transistor action and the level of current flow in network 121 is maintained at the level sufficient to cause oscillator means 105 to continue to oscillate for at least a predetermined period of time subsequent to the opening of switch 37. Selection of components permits such predetermined period of time to be adjusted to insure that Q1 will be able to operate for a period of time long in comparison to the time that the closing of switch 37 is interrupted.

The circuit shown in FIG. 5, when switch 37 is open, is such that the battery is always applied across the collector and base of Q2 with the result that a small amount of leakage current can flow. Over a long period of time, such leakage current could increase the temperature of the collector-base junction thereby permitting the leakage current to increase, which creates a regenerative situation which may lead to either destruction of the transistor or depletion of the battery. Such a situation is prevented by the use of a high resistance at 127.

As a specific example of a device actually constructed and capable of achieving the results above described, the values of the components in the circuit diagram of FIG. 6 are tabulated below.

| Component: | Value |
|---|---|
| C1 | 10 μf.±30% 4 v. |
| C2 | 1 μf.±30% 4 v. |
| D1 | 1N456. |
| L1 | 7 turns. |
| L2 | 2 turns. |
| Q1 | Transistor. |
| Q2 | Transistor. |
| R1 | 470 ohms 10% ¼ w. |
| R2 | 560 ohms 10% ¼ w. |
| E₀ | 4.5 volts. |

| Transistor Characteristic | Q1 | Q2 |
|---|---|---|
| $V_{ce}$ sat. ($I_c$=400 ma., $I_{be}$=20 ma.) | 0.6 v | 0.6 v. |
| $h_{fe}$ ($I_c$=50 ma., $V_{ce}$=1 v.) | 80–360 | 80–360. |
| $I_{cbo}$ ($V_{cb}$=6 v.) | 15 μa | 15 μa. |
| $I_{cbo}$ ($V_{cb}$=10 v.) | 20 μa | 20 μa. |
| $I_{cer}$ ($V_{ce}$=15 v., $R_{be}$=1 K.) | 300 μa | 300 μa. |

Those skilled in the art can now appreciate that the present invention permits continuous operation of a transmitter subsequent to the closing of a switch and despite intermittent opening thereafter. Furthermore, it will be understood that the control means above described includes a transistor configuration (namely, the configuration containing Q2) constructed and arranged to operate as a bi-state switch connected to the oscillator means for controlling the energization thereof. In one state, the switch causes the oscillator means to be energized and in the other state, it causes the oscillator to be deenergized. In addition, the control means includes holding means in the form of capacitor 126 responsive to the closing of the flash contacts for maintaining the bi-state switch in its first state for a predetermined period of time subsequent to opening of the contacts.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

For use with a photographic camera having shutter-actuated flash contacts, a transmitter device for triggering by electromagnetic wave energy flash apparatus disposed remotely from the camera, comprising:
(a) signal generating means for generating and radiating output signals in response to the application of a predetermined minimum control voltage;
(b) a semiconductor device having emitter, base and collector electrodes;
(c) network means connected in the emitter circuit of said device for developing said control voltage;
(d) conductor means between said base and collector electrodes of said device for connecting said transmitter device to flash contacts of a photographic camera;
(e) a source of potential connected across said network means and said semiconductor device to said collector electrode for providing forward bias voltage on said emitter electrode with respect to said base and collector electrodes; and
(f) a capacitor connected across said network means and the emitter-base junction of said semiconductor device to said base electrode to sustain said forward bias voltage should jitter cause said contacts to intermittently separate, and to thus drive said semiconductor device as a current amplifier during the brief intervals of contact separation, whereby said predetermined minimum control voltage is maintained in said network means.

References Cited by the Examiner

UNITED STATES PATENTS

| | | | |
|---|---|---|---|
| 2,419,978 | 5/1947 | Wildman | 95—11.5 |
| 2,577,522 | 12/1951 | Hite et al. | 331—149 |
| 2,764,072 | 9/1956 | Walsh | 95—11.5 |
| 2,902,610 | 9/1959 | Sample | 307—106 |
| 3,051,944 | 8/1962 | Smith. | |
| 3,153,195 | 10/1964 | Kille | 325—102 |
| 3,185,056 | 5/1965 | Gold et al. | 95—11.5 |
| 3,243,794 | 3/1966 | Phillips et al. | 331—112 X |

DAVID G. REDINBAUGH, *Primary Examiner.*

JOHN M. HORAN, JOHN W. CALDWELL, *Examiners.*